United States Patent [19]
Kawase et al.

[11] Patent Number: 5,976,736
[45] Date of Patent: Nov. 2, 1999

[54] TONER COMPOSITION AND USE THEREOF FOR FORMING SINTERED PATTERN ON SOLID SURFACE

[75] Inventors: Hiromitsu Kawase; Masaru Matsuda, both of Shizuoka-ken, Japan

[73] Assignee: Ricoh Company, Ltd., Tokyo, Japan

[21] Appl. No.: 08/985,737

[22] Filed: Dec. 5, 1997

[30] Foreign Application Priority Data

| Dec. 5, 1996 | [JP] | Japan | 8-340608 |
| Dec. 30, 1996 | [JP] | Japan | 8-358629 |
| Dec. 30, 1996 | [JP] | Japan | 8-358630 |
| Dec. 2, 1997 | [JP] | Japan | 9-347270 |

[51] Int. Cl.$^6$ .......................... G03G 9/09; G03G 13/22; G03C 3/00
[52] U.S. Cl. .......................... 430/18; 430/106; 430/126; 430/137
[58] Field of Search .............................. 430/18, 106, 126, 430/137

[56] References Cited

U.S. PATENT DOCUMENTS

| 3,565,654 | 2/1971 | Story | 106/243 |
| 5,422,216 | 6/1995 | Smith et al. | 430/106.6 |
| 5,750,299 | 5/1998 | Ohshima et al. | 430/47 |

FOREIGN PATENT DOCUMENTS

| 0 751 434 | 1/1997 | European Pat. Off. . |
| 0 762 223 | 3/1997 | European Pat. Off. . |
| 0 774 696 | 5/1997 | European Pat. Off. . |
| 0 834 784 | 4/1998 | European Pat. Off. . |
| 44 13 168 | 4/1995 | Germany . |

OTHER PUBLICATIONS

Patent Abstracts of Japan, vol. 096, No. 009, Sep. 30, 1996, JP 08 119 668, May 14, 1996.

Derwent Abstracts, AN 96–283 233, JP 08 119 668, May 14, 1996.

*Primary Examiner*—Roland Martin
*Attorney, Agent, or Firm*—Oblon, Spivak, McClelland, Maier & Neustadt, P.C.

[57] ABSTRACT

A toner composition useful for forming a single or full colored image on a transfer sheet, containing a finely divided coloring agent, and a binder resin, wherein the coloring agent includes a compound oxide pigment and a flux. By sintering a ceramic, such as a tile, on which the image-bearing transfer sheet has been applied, a pattern corresponding to the toner image is formed on the ceramic.

25 Claims, No Drawings

TONER COMPOSITION AND USE THEREOF FOR FORMING SINTERED PATTERN ON SOLID SURFACE

BACKGROUND OF THE INVENTION

This invention relates to a toner composition for developing an electrostatic latent image on a sheet. The present invention is also directed to use of the above toner image-bearing sheet for forming a sintered, mono-colored or full colored pattern on a solid surface such as a tile or a glazed porcelain.

Hitherto, a screen printing method has been utilized for the formation of similar patterns on a plurality of tiles or the like porcelain articles. JP-A-H8-119668 proposes a method in which electrophotography is utilized in place of the screen printing and discloses a toner containing a binder and a pigment for ceramic art. The toner is used for developing an electrostatic latent image formed on a transfer sheet. The toner image-bearing transfer sheet is then applied onto a surface of a ceramic body and heated to fix the pattern on the surface. JP-A-H8-119668 suggests to use the pigment in the form of a mixture with a vitreous such as boro-silicated glass. Such a mixture is produced by blending one or more metal oxide pigments with a vitreous, the blend being subsequently fused at 900° C. and, thereafter, cooled and ground.

The toner proposed in JP-A-H8-119668, however, has a problem because a pattern having a high image density is not obtainable and because the color of the image is not uniform.

SUMMARY OF THE INVENTION

It is, therefore, an object of the present invention to provide a metal oxide pigment-containing toner useful for forming a pattern on a solid surface, such as ceramics, and having a satisfactory color density even when the amount of the pigment is small.

Another object of the present invention is to provide a toner having a high developing efficiency so that an electrostatic latent image on a transfer sheet can be effectively developed to give a high density toner image.

It is a further object of the present invention to provide a toner of the above-mentioned type with which a clear mono-colored or full colored pattern can be formed with good reproducibility on a solid surface such as ceramics.

In accomplishing the foregoing object, there is provided in accordance with the present invention a toner composition comprising a finely divided coloring agent, and a binder resin, the coloring agent including a compound oxide pigment and a flux.

In another aspect, the present invention provides a toner composition comprising a finely divided coloring agent, and a binder resin, the coloring agent including a flux, and a metal oxide pigment which contains a plurality of metal components and in which said metal components show the same two-dimensional distribution when analyzed by an electron prove microanalyzer.

The present invention also provides an image forming method, comprising subjecting a transfer sheet to electrophotography using the above toner composition to form an image of the toner on the transfer sheet.

The present invention further provides a sheet material comprising a transfer sheet having an image formed of the above toner composition.

The present invention further provides a method of forming a pattern on a heat-resisting solid surface, comprising applying the above-described image-bearing sheet on the surface, and sintering the applied surface.

The present invention further provides a process for the production of a toner, comprising the steps of:

heating a blend of a plurality of metal compounds at a temperature of 1,000–1,300° C. to form a metal oxide pigment having a desired color, grinding the pigment, mixing the pigment with a flux, sintering the mixture of the pigment with the flux at a temperature of 750–800° C., then grinding the sintered mixture, then kneading the ground sintered mixture with a thermoplastic resin binder, and grinding the kneaded mixture.

Other objects, features and advantages of the present invention will become apparent from the detailed description of the preferred embodiments of the invention to follow.

DETAILED DESCRIPTION OF THE PREFERRED EMBODIMENTS OF THE INVENTION

The toner according to the present invention includes a binder resin and a finely divided coloring agent which comprises a compound oxide pigment and a flux.

The compound oxide pigment is not a mere mixture of a plurality of metal oxides but, rather, a metal oxide containing a plurality of metals which interact with each other. A compound oxide pigment consisting of two metal components is known as a double oxide. Whether or not a metal oxide pigment containing a plurality of metal components is a compound oxide pigment can be determined by the analysis with an electron probe microanalyzer. When the metal components of the pigment have the same two-dimensional distribution, then the pigment is regarded as being a compound oxide pigment.

The compound oxide pigment may be obtained by heating a blend of a plurality of metal compounds at a temperature of 1,000–1,300° C. to form a metal oxide pigment having a desired color. The metal oxide pigment is then cooled, solidified and ground to obtain a compound oxide pigment. The compound oxide pigment preferably has a volume average particle diameter of not more than 100 μm as measured by a method using a particle size measuring device of a laser scattering type in which the sample to be measured is sonicated in a surfactant-containing water.

The compound oxide pigment has been found to give a higher color density than a colorant of a mere mixture of the corresponding metal compounds. Namely, desirable color concentration can be obtained even with a small amount of the pigment. It is desirable that satisfactory color density be obtained with an amount of the pigment of $9.45 \times 10^{-4}$ g/cm$^2$ or less in the case of yellow pigment, $9.45 \times 10^{-4}$ g/cm$^2$ or less in the case of magenta pigment, $7.35 \times 10^{-4}$ g/cm$^2$ or less in the case of cyan pigment and $7.35 \times 10^{-4}$ g/cm$^2$ or less in the case of black pigment.

Examples of suitable compound oxide pigments include:
(1) yellow pigment obtained from antimony pentaoxide ($Sb_2O_5$), ferric oxide ($Fe_2O_3$) and minium ($Pb_3O_4$);
(2) cyan pigment obtained from cobalt oxide (CoO), zinc white (ZnO) and chromium oxide ($Cr_2O_3$);
(3) black pigment obtained from cobalt oxide (CoO), manganese oxide ($MnO_2$), cromium oxide ($Cr_2O_3$) and ferric oxide ($Fe_2O_3$);
(4) magenta pigment obtained from gold (Au), ferrous oxide (FeO) and tin oxide (SnO).

The compound oxide pigment is composited with a flux to form the coloring agent. It is preferred that the pigment be covered with the flux for reasons of the prevention of leakage of electrostatic charges during a developing stage.

It is also preferred that the flux have an electric resistivity greater than that of the compound oxide pigment. Generally, the electric resistivity of the flux is $10^6$–$10^{16}$ Ω·cm, while that of the pigment is $10^5$–$10^8$ Ω·cm.

The flux serves to bind the toner image on a solid surface to be colored such as a ceramic surface when sintered. A glaze material customarily used in the field of the ceramic art may suitably used as the flux.

The flux may be, for example, a feldspar, e.g. potassium feldspar, sodium feldspar or lithium feldspar; a natural mineral, e.g. kaolin, alumina, silica rock, quartz, titania, silica, chamotte, limestone, talc, magnesite, dolomite, soil ash or a mixture thereof; an alkali metal or alkaline earth metal hydroxide such as lithium hydroxide; an alkali metal or alkaline earth metal carbonate such as lithium carbonate; an alkali metal or alkaline earth metal chloride; aluminum chloride; boric acid; an alkali metal or alkaline earth metal salt of boric acid; an alkali metal or alkaline earth metal salt of metaboric acid; an alkali metal or alkaline earth metal salt of phosphoric acid; an alkali metal or alkaline earth metal salt of pyrophosphoric acid; an alkali metal or alkaline earth metal salt of silicic acid; an alkali metal or alkaline earth metal salt of metasilicic acid; zirconium silicate; bone ash; borax; ammonium metavanadate; a metal oxide such as tungsten oxide, vanadium pentaoxide, tin oxide, zirconium oxide, cerium oxide or molybdenum oxide or lead oxide; a metal fluoride such as calcium fluoride or aluminum fluoride; glass; or a mixture thereof.

It is preferred that the flux contain a lead compound for reasons of improved adhesiveness and film forming property. It is also preferred that the flux be transparent upon being sintered for reasons of clearness of images. It is further preferred that the flux have the same series of color tone with that of the pigment upon being sintered. The term "same series of color tone" used herein is intended to refer to, for example, the relationship between red and pink, between egg yellow and lemon yellow or between dark blue and sky blue. In such a case, the flux does not adversely affect the color tone of the pigment when the toner image is fixed.

The flux and the compound oxide pigment are composited by sintering a mixture of the pigment with the flux at a temperature of, preferably, 750–800° C., and then grinding the sintered mixture to obtain the finely divided coloring agent. In this case, it is preferred that the flux be heat treated at a temperature of 1,000–1,300° C. before being mixed with the pigment for reasons of the prevention of discoloration of the compound metal oxide pigment during sintering. The weight ratio of the compound oxide pigment to the flux is preferably 0.1 to 3. The coloring agent preferably has an average diameter of 1–10 μm.

The coloring agent is used for the preparation of toner for use in electrophotography as a mixture thereof with a binder resin and any other suitable known additives or, if desired, may be utilized as such for screen printing, ink jet printing and solid jet printing. When utilized as a toner, the finely divided coloring agent containing the above flux and pigment is mixed in any known manner with a binder. For example, a blend of the coloring agent and the binder is kneaded at a temperature higher than melting point of the binder. The kneaded mixture is then solidified and ground into particles to obtain a toner according to the present invention. The toner preferably has an average particle diameter of 5–20 μm. The amount of the coloring agent in the toner is preferably 5–60% by weight.

The binder may be any thermoplastic resin conventionally used in the field of toner for electrophotography, such as a polyester resin, a polystyrene resin, a polyethylene resin, a polyamide resin, an epoxy resin, an epoxypolol resin, a terpene resin or a mixture thereof. Illustrative of suitable thermoplastic resins are polystyrene, styrene-methyl acrylate copolymers, styrene-ethyl acrylate copolymers and styrene-acrylic acid-n-butyl acrylate copolymers.

The toner preferably contains a customarily employed charge controlling agent. Illustrative of suitable positively charging agents are nigrosine dyes, quaternary ammonium salts, Cr-containing dyes, Zn-containing dyes, Fe-containing dyes, chelate dyes of molybdic acid and fluorine-modified quaternary ammonium salts. The amount of the charge controlling agent is generally 0.1–10 parts by weight, preferably 2–6 parts by weight, per 100 parts by weight of the binder resin.

The toner according to the present invention may further contain one or more additives, if desired. Illustrative of additives are zinc stearate, hydrophobic silica, aluminum stearate and titanium oxide.

The toner of the present invention may be used as a single-component-type developing system in which the toner is used by itself for developing an electrostatic latent image or as a two-component-type developing system in which the toner is used in conjunction with carrier particles for developing an electrostatic latent image. The carrier may be (a) magnetic particles such as of metals, compounds and alloys of iron, cobalt and nickel, (b) glass beads or (c) composite particles composed of the above magnetic particles or glass beads each coated with a layer of a resin. Illustrative of suitable resin for forming the resin coating are polycarbon fluoride, polyvinyl chloride, polyvinylidene chloride, phenol resin, polyvinyl acetal and silicone resin. In the two-component-type system, the toner is used in an amount of 1–20 parts by weight, preferably 8–12 parts by weight, per 100 parts by weight of the carrier.

The toner according to the present invention is used for forming a desired mono-color or full color pattern on a heat-resisting solid surface. The pattern can be formed by directly developing a toner image on the solid surface, the developed toner image being subsequently heated to fix the image on the solid surface. Alternatively, the pattern can be formed by a method including developing a toner image on a transfer sheet, then applying the image-bearing sheet on the solid surface, and heating the sheet to fix the image on the solid surface. Since the former, direct method requires a specific machine for developing the toner image, the latter, indirect method is preferably adopted.

In the indirect method, a commercially available mono-color or full color copying machine can be used for developing a desired toner image on a transfer sheet. The transfer sheet may be constituted of a substrate, such as a paper, a resin film or a glass film, having coated thereover an adhesive layer such as a water-soluble adhesive, e.g. dextrin or polyvinyl alcohol. The toner image is formed on the adhesive layer. Commercially available transfer sheets of a screen printing type used in the field of ceramic art may be used as such for the purpose of the present invention.

The image-bearing surface of the transfer sheet is preferably applied with a solution or dispersion containing a water-insoluble thermoplastic resin, glass powder or flux powder, since the pattern after calcination has improved clearness. The transfer sheet is then immersed in water and separated into the substrate and the surface layer having the toner image.

The image-bearing surface layer thus separated from the substrate is applied to an article having a heat-resisting surface, such as a tile, a glazed ceramic (e.g. a ceramic glass, a porcelain or a china), a heat-resisting glass, a metal or a porcelain enamel-coated metal.

It is preferred that the heat-resisting solid surface have a high whiteness for reasons of availability of a clear colored pattern. Preferably, the whiteness of the solid surface is such that the reflectance of a light having a wave length in the range of 450–800 nm is at least 93%, more preferably at least 98%. Further, it is preferred that the solid surface be low in surface roughness, i.e. the 10 points average surface roughness Rz in accordance with Japan TAPPI Paper Pulp Test Method No. 5-74 is preferably 5 $\mu$m or less, more preferably 1 $\mu$m or less.

It is also preferred that the solid surface be coated with a fusible inorganic substance, such as a glass, glaze or flux, for reasons of improved adhesion of the toner pattern on the solid surface. Such a coating preferably has a thickness of 1–20 $\mu$m, more preferably 3–10 $\mu$m. Alternatively, the fusible inorganic substance may be incorporated into the solid surface, if desired.

The solid surface on which the image-bearing surface layer is applied is then sintered at 800–850° C. for 1–10 hours in any known oven or kiln, such as an electric oven, a microwave oven or a dielectric oven, to obtain a final product having the mono-color or full color pattern. If necessary, the sintering is carried out while controlling the oxidation and reduction conditions.

The following examples will further illustrate the present invention. Parts are by weight.

Preparation of Flux:

A blend of metal oxides composed of 80 parts of $Al_2O_3$, 370 parts of $SiO_2$, 50 parts of $Na_2O$ and 500 parts of PbO (hereinafter such a blend will be simply expressed as $Al_2O_3/SiO_2/Na_2O$/PbO of 80/370/50/500) was ground with a stamp mill and then mixed with a Henschel mixer. The mixture was then heat-treated at 1,200° C. to obtain a flux (hereinafter referred to as Flux A). A sample (10 g) of Flux A was placed in a cylindrical electrode chamber of High Resistance Meter 4329 (manufactured by YHP Inc.) and measured for the volume resistivity under a load of 5 g. The measurement was carried out for five samples and the resistivity values were averaged. Flux A was found to have a resistivity of $1.69\times10^9$ $\Omega\cdot$cm.

Preparation of Coloring Agents:

(A) Black Compound Oxide Pigment:

A blend of metal oxides $Cr_2O_3$/MnO/$Fe_2O_3$/CoO of 110/270/112/508 was ground with a stamp mill and then mixed with a Henschel mixer. The mixture was then heat-treated at 1,100° C. to obtain a compound oxide pigment (hereinafter referred to as Pigment A).

Pigment A (300 parts) was then mixed with 500 parts of Flux A with a Henschel mixer and the mixture was calcined at 750° C. and ground to obtain a coloring agent (hereinafter referred to as Coloring Agent A).

(B) Yellow Compound Oxide Pigment:

A blend of metal oxides $Fe_2O_3/Sb_2O_5/Pb_3O_4$ of 10/190/800 was ground with a stamp mill and then mixed with a Henschel mixer. The mixture was then heat-treated at 1,100° C. to obtain a compound oxide pigment (hereinafter referred to as Pigment B).

Pigment B (300 parts) was then mixed with 500 parts of Flux A with a Henschel mixer and the mixture was calcined at 750° C. and ground to obtain a coloring agent (hereinafter referred to as Coloring Agent B).

(C) Magenta Compound Oxide Pigment:

A blend of metal oxides $Fe_2O_3$/NiO/CuO/$Au_2O$ of 160/40/40/760 was ground with a stamp mill and then mixed with a Henschel mixer. The mixture was then heat-treated at 1,100° C. to obtain a compound oxide pigment (hereinafter referred to as Pigment C).

Pigment C (300 parts) was then mixed with 500 parts of Flux A with a Henschel mixer and the mixture was calcined at 750° C. and ground to obtain a coloring agent (hereinafter referred to as Coloring Agent C).

(D) Cyan Compound Oxide Pigment:

A blend of metal oxides $Cr_2O_3/Fe_2O_3/Co_2O_3$/ZnO of 170/10/690/130 was ground with a stamp mill and then mixed with a Henschel mixer. The mixture was then heat-treated at 1,100° C. to obtain a compound oxide pigment (hereinafter referred to as Pigment D).

Pigment D (300 parts) was then mixed with 500 parts of Flux A with a Henschel mixer and the mixture was calcined at 750° C. and ground to obtain a coloring agent (hereinafter referred to as Coloring Agent D).

(E) Black Oxide Pigment E:

A blend of metal oxides $Cr_2O_3$/MnO/$Fe_2O_3$/CoO of 110/270/112/508 was ground with a stamp mill and then mixed with a Henschel mixer to obtain an oxide pigment (hereinafter referred to as Pigment E).

Pigment E (300 parts) was then mixed with 500 parts of Flux A with a Henschel mixer and the mixture was calcined at 900° C. and ground to obtain a coloring agent (hereinafter referred to as Coloring Agent E).

(F) Black Oxide Pigment F:

$Cr_2O_3$ (300 parts) was mixed with 500 parts of Flux A with a Henschel mixer and the mixture was calcined at 900° C. and ground to obtain a first mixture. MnO (300 parts) was mixed with 500 parts of Flux A with a Henschel mixer and the mixture was calcined at 900° C. and ground to obtain a second mixture. $Fe_2O_3$ (300 parts) was mixed with 500 parts of Flux A with a Henschel mixer and the mixture was calcined at 900° C. and ground to obtain a third mixture CoO (300 parts) was mixed with 500 parts of Flux A with a Henschel mixer and the mixture was calcined at 900° C. and ground to obtain a fourth mixture. The first to fourth mixtures were then mixed to obtain a coloring agent F having a weight ratio of $Cr_2O_3$/MnO/$Fe_2O_3$/CoO of 110/270/112/508.

Physical Properties of Pigments A-F and Coloring Agents A-F:

Pigments A–F were each measured for volume resistivity and found to range from $1.56\times10^6$ $\Omega\cdot$cm to $5.89\times10^8$ $\Omega\cdot$cm. Electron microscopic analysis (SEM, magnification: 2,000) of Coloring Agents A–F revealed that Pigments A–F were covered with Flux A.

Coloring Agents A–F were analyzed with an electron probe X-ray microanalyzer (EPMA-8705 manufactured by Shimadzu Seisakusho Co., Ltd.) according to the following method:

A sample is irradiated with an electron beam (beam diameter: 1 $\mu$m) and the characteristic X-rays generated are spectrometrically analyzed for respective elements constituting the coloring agent. Color mapping is carried out for respective elements in accordance with the SEM image (magnification: 2000). The area of the pattern on the color mapping of each of the elements is measured. The area (S1, S2, . . . Sn) of the pattern of each of the elements constituting the pigment is compared with the area (S) of a selected one of the elements (for example Pb) of the flux. When each of the areas S1 through Sn is within the range of 0.9 S to 1.1 S, then the distribution of the elements constituting the pigment is regarded as being the same.

The results showed that Coloring Agents A–D shows the same distribution. The distribution of the elements constituting the pigments of Coloring Agents E and F was evaluated as being not the same.

Preparation of Carrier:

Silicone resin (KR50 manufactured by Shinetsu Kagaku Inc.) 100 parts

Carbon black (BP 2000 manufactured by Cabott Inc.) 3 parts

Toluene 100 parts

The above composition was mixed with a mixer for 30 minutes to form a dispersion. The dispersion was charged into a fluidized bed-type coating device together with 1,000 parts of ferrite particles having an average particle diameter of 100 $\mu$m. The ferrite particles thus coated were dried to obtain Carrier A.

Preparation of Toner and Developer:

230 Parts of each of Coloring Agents A–F, 100 parts of an epoxy resin (Tg: 60° C.) and 4 parts of zinc salicylate (Bontron $84 manufactured by Orient Chemical Inc.) were mixed with each other using a mixer and the mixture was kneaded with a two-roll kneader. The kneaded mixture was then rolled, solidified, ground and sieved to obtain a toner (Toner A through Toner F) having the volume average particle diameter shown in Table 1 above. Each of Toner A through Toner F was mixed with 0.5% by weight of hydrophobic silica (R972 manufactured by Japan Aerosil Inc.) using a mixer. The resulting mixture (90 parts) was further mixed with 910 parts of Carrier A using a ball mill for 30 minutes to obtain Developer A through Developer F.

TABLE 1

| Developer | Toner | Average Particle Diameter of Toner ($\mu$m) |
| --- | --- | --- |
| Developer A | Toner A | 9.3 |
| Developer B | Toner B | 9.5 |
| Developer C | Toner C | 9.7 |
| Developer D | Toner D | 9.3 |
| Developer E | Toner E | 9.1 |
| Developer F | Toner F | 9.0 |

Formation of Pattern on Tile:

A copy image was formed on a commercially available transfer sheet (OK Series sheet for stencil printing in the ceramic art; manufactured by Nitto Shiko Inc.; a laminate composed of a surface layer, an adhesive layer and a substrate) using each of Developers A through F charged in a copying machine (Imagio 530 manufactured by Ricoh Company, Ltd.) under the following conditions.

Process speed: 120 m/sec

Charging voltage: −650V

Exposure voltage: −100V

Development gap: 0.6 mm

Doctor gap: 0.45 mm

Linear speed ratio: 1.5 (relative to the photoconductor)

Development bias: AC(p-p1KV)+DC(−500V)

Belt transfer bias: 1400V

Paper transfer bias: 1300V

The toner image-bearing surface of the transfer sheet was applied with a polystyrene resin coating and then immersed in water to remove the substrate. The surface layer was applied on a tile (RS252/1001 manufactured by INAX Inc.) and the assembly was sintered at 800° C. for 5 hours to obtain a desired tile having a pattern corresponding to the toner image. The image density of the pattern on the tile formed using each of Developers A–F is shown in Table 2.

TABLE 2

| Developer | Image Density |
| --- | --- |
| A | 1.57 |
| B | 1.12 |
| C | 1.09 |
| D | 1.07 |
| E* | 0.82 |
| F* | 0.52 |

:*Comparative Example

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A toner composition comprising a finely divided coloring agent, and a binder resin, said coloring agent comprising a compound oxide pigment which has been sintered with a flux.

2. A composition as claimed in claim 1, wherein said pigment is covered with said flux.

3. A composition as claimed in claim 1, wherein said flux has an electric resistivity greater than that of said pigment.

4. A composition as claimed in claim 1, wherein said flux comprises lead oxide.

5. A composition as claimed in claim 1, wherein said flux is transparent upon being sintered.

6. A composition as claimed in claim 1, wherein said flux and said pigment have the same color tone.

7. A composition as claimed in claim 1, wherein the amount of said pigment is in the range of 0.1–3 parts by weight per part by weight of said flux.

8. A composition as claimed in claim 1, and having an average particle diameter of 5–20 $\mu$m.

9. A composition as claimed in claim 1, and being yellow, magenta, cyan or black.

10. A toner composition comprising a finely divided coloring agent, and a binder resin, said coloring agent comprising a metal oxide pigment which contains a plurality of metal components and in which said metal components show the same two-dimensional distribution when analyzed by an electron probe microanalyzer and which has been sintered with a flux.

11. A composition as claimed in claim 10, wherein said pigment is covered with said flux.

12. A composition as claimed in claim 10, wherein said flux has an electric resistivity greater than that of said pigment.

13. A composition as claimed in claim 10, wherein said flux comprises lead oxide.

14. A composition as claimed in claim 10, wherein said flux is transparent upon being sintered.

15. A composition as claimed in claim 10, wherein said flux and said pigment have the same color tone.

16. A composition as claimed in claim 10, wherein the amount of said pigment is in the range of 0.1–3 parts by weight per part by weight of said flux.

17. A composition as claimed in claim 10, and having an average particle diameter of 5–20 $\mu$m.

18. A composition as claimed in claim 10, and being yellow, magenta, cyan or black.

19. An image forming method, comprising forming an image using a toner composition according to claim 1 and transferring the image to a transfer sheet.

20. A method as claimed in claim 19, further comprising covering said image formed on said transfer sheet with a layer of a material selected from the group consisting of thermoplastic resins, glass and vetrifiable substances.

21. A sheet material comprising a transfer sheet having an image formed of a toner composition according to claim 1.

22. A sheet material as claimed in claim 21, further comprising a layer covering said image and formed of a material selected from the group consisting of thermoplastic resins, glass and vetrifiable substances.

23. A method of forming a pattern on a heat-resisting solid surface, comprising applying an image-bearing sheet according to claim 21 on said surface, and sintering said applied surface.

24. An article obtained according to claim 23.

25. A process for the production of a toner of claim 1, comprising the steps of:

heating a first blend of a plurality of metal compounds at a temperature of 1,000–1,300° C. to form a metal oxide pigment having a desired color, grinding said pigment, heating a second blend of a plurality of metal compounds at a temperature of 1,000–1,300° C. to form a flux, then grinding said flux, mixing said pigment with said flux, sintering said mixture of said pigment with said flux at a temperature of 750–800° C., then grinding said sintered mixture, then kneading said ground sintered mixture with a thermoplastic resin binder, and grinding said kneaded mixture.

\* \* \* \* \*

UNITED STATES PATENT AND TRADEMARK OFFICE
CERTIFICATE OF CORRECTION

PATENT NO. : 5,976,736

DATED : NOVEMBER 2, 1999

INVENTOR(S): HIROMITSU KAWASE ET AL

It is certified that an error appears in the above-identified patent and that said Letters Patent is hereby corrected as shown below:

Column 1, line 57, "prove" should read --probe--.

Column 6, line 35, "third mixture CoO" should read --third mixture. CoO--;
line 66, "shows" should read --show--.

Signed and Sealed this

Fifth Day of December, 2000

Attest:

Q. TODD DICKINSON

Attesting Officer

Director of Patents and Trademarks